(No Model.) 2 Sheets—Sheet 1.

J. GREENWOOD.
APPARATUS FOR THE PRODUCTION OF CHLORINE AND CAUSTIC SODA.

No. 489,677. Patented Jan. 10, 1893.

Witnesses
C. D. Kesler
J. W. Foster

James Greenwood
Inventor:
By John J. Halsted Jr.
his Attys (No Model.) 2 Sheets—Sheet 2.
J. GREENWOOD.
APPARATUS FOR THE PRODUCTION OF CHLORINE AND CAUSTIC SODA.
No. 489,677. Patented Jan. 10, 1893.

Witnesses. Inventor.

UNITED STATES PATENT OFFICE.

JAMES GREENWOOD, OF LONDON, ENGLAND, ASSIGNOR TO THE CAUSTIC SODA AND CHLORINE SYNDICATE, LIMITED, OF SAME PLACE.

APPARATUS FOR THE PRODUCTION OF CHLORINE AND CAUSTIC SODA.

SPECIFICATION forming part of Letters Patent No. 489,677, dated January 10, 1893.

Application filed April 7, 1891. Serial No. 388,012. (No model.)

*To all whom it may concern:*

Be it known that I, JAMES GREENWOOD, a subject of the Queen of Great Britain, residing at London, England, have invented new and useful Improvements in the Manufacture or Production of Chlorine and Caustic Soda and in Apparatus Therefor, of which the following is a specification.

My invention relates to improvements in the manufacture or production of chlorine and caustic soda by means of electrolysis.

In manufacturing or producing caustic soda and chlorine according to my invention I decompose a solution of sodium chloride or common salt by a current of electricity in one or a series of cylindrical square or oblong vessels of iron or combined metal and carbon having porous partitions or diaphragms, all as more particularly hereinafter described by reference to the accompanying drawings, in which:—

Figure 1:
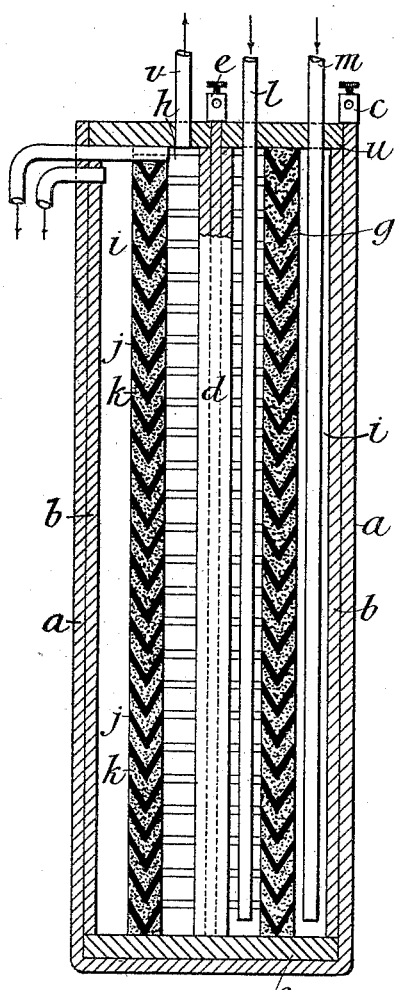
Figure 4:
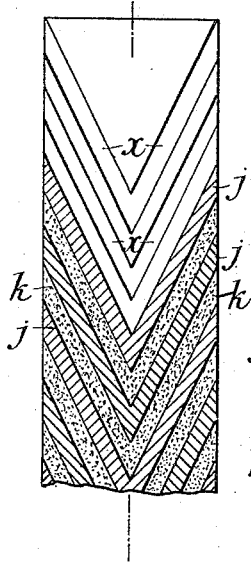
Figure 5:
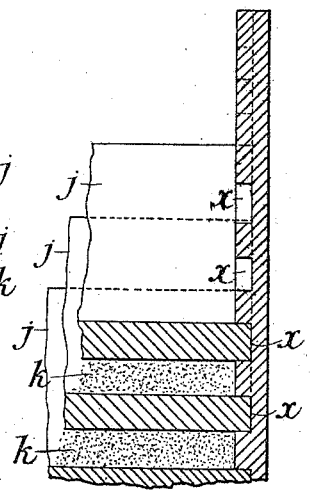
Figure 2:
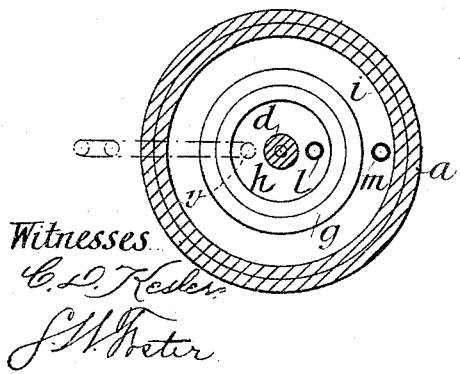
Figure 3:
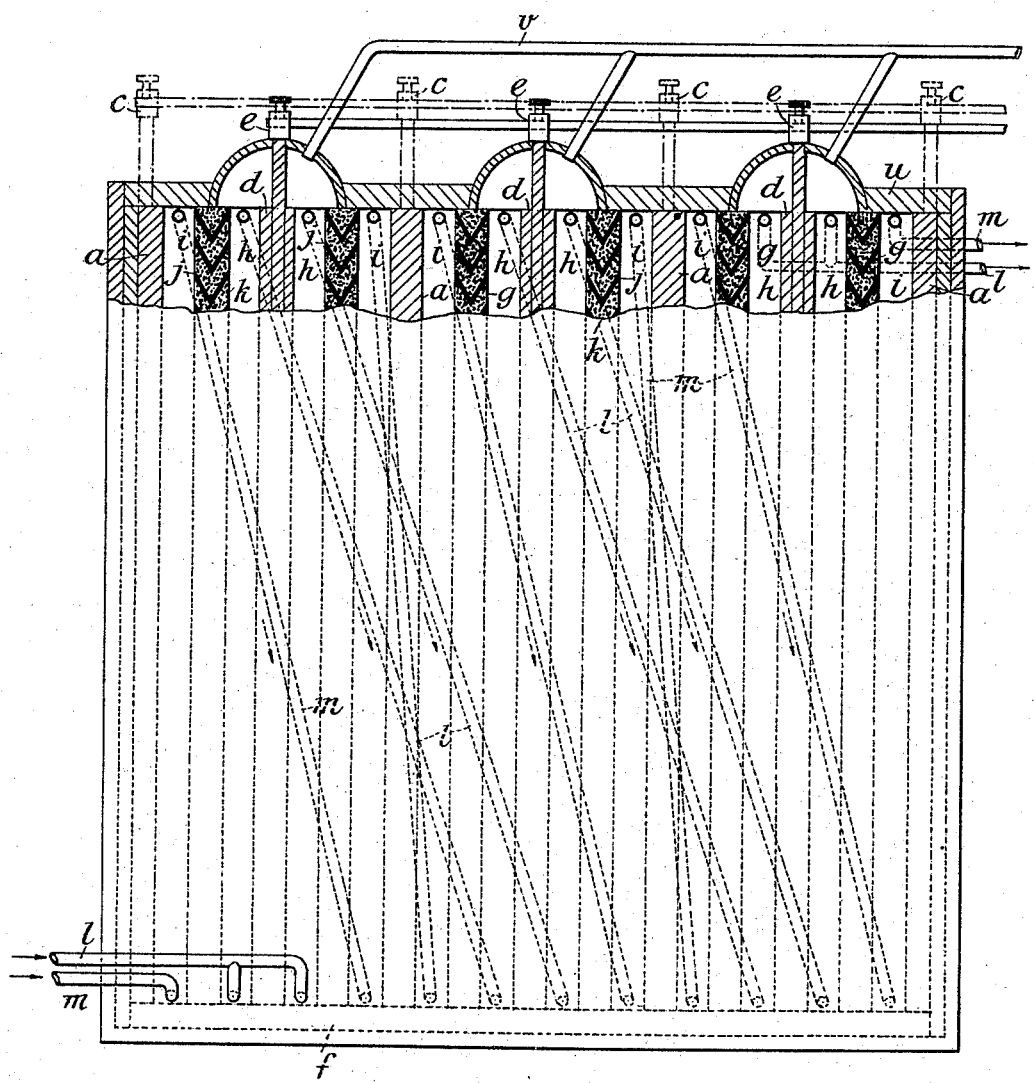

Figures 1 and 2 are respectively a vertical and a horizontal section of one of my vessels of a circular form for producing caustic soda and chlorine gas according to my invention: Fig. 3, an elevation partly in section of my vessel of an oblong form. Fig. 4 is a sectional elevation, on a larger scale, showing one of the said supports and some of the troughs, and Fig. 5 is a section, also enlarged, on the line 7. 7. of Fig. 4: $x$, $x$, indicating the grooves in the said supports in which grooves the ends of the troughs are located and supported.

Similar reference letters indicate similar or corresponding parts throughout the drawings.

I will first describe my circular form of vessel shown in Figs. 1 and 2.

$a$ indicates the wall of the electrolytic vessel, which wall, when of copper, or other metal than iron, is coated with carbon in the manner hereinafter described, the carbon being shown at $b$; but if the wall is of iron I use it uncoated. The wall of the vessel also serves as the cathode, the terminal $c$ of which is connected with the negative pole of a dynamo or other electrical generator. In the center of the said vessel a combined metal and carbon cylinder $d$ is placed in a vertical position which forms the anode, the terminal $e$ of which is connected with the positive pole of the said dynamo or other electrical generator. The metal-carbon combination referred to above, is formed by electrolytically depositing a film of copper or other suitable metal upon the adhering surface of the carbon, and then soldering the same to the copper or other metal required to be combined with it, thus forming a perfectly homogeneous combination of the metal and carbon, which is well adapted for electrodes in which metal is altogether unsuitable for the purpose.

In forming my anode I take a number of retort carbon plates of suitable size and thickness, which I render non-porous by placing in a cylinder and exhausting the air therefrom, and then forcing under considerable pressure, heated tar or other suitable hydrocarbon oil or vapor into the pores of the carbons, after which they are carbonized in the usual manner. To form an adhesive surface with the metal core, the carbons are coated on one side with an electro-deposited film of copper and then tinned. The carbons are then cemented together in a double sided metal casting box and heated to the fusing temperature of the metal forming the core, and molten type metal or other suitable alloy or metal is then poured into the casting box between the two surfaces of carbon, thus forming the carbons and metal core into a solid and homogeneous plate. The terminal of the anode is formed by a strip of copper cast into the plate at the same time. The anode $d$ is insulated from the cathode $a$ by means of a slate or other insulating plate $f$ placed at the bottom of the vessel.

At a suitable distance between the anode $d$ and the cathode $a$ a porous partition or diaphragm $g$ divides the vessel into what may be described as the anode or chlorine section $h$ and the cathode or caustic soda section $i$. The use of this diaphragm $g$ enables me to dispense entirely with the usual porous partition of high resistance hitherto employed. My diaphragm is formed by a number of V-shaped troughs $j$ of porcelain or other suitable substance such as glass or slate which are filled with carded asbestus fiber $k$ or other suitable porous material such as a quantity of powdered steatite. These troughs are built up inside each other as shown clearly in Fig. 1, so as to prevent the diffusion of the chlorine gas evolved in the anode section $h$ into the cathode section $i$ and thus separates the products obtained in each of the said sections in the most effectual manner. These V-shaped troughs $j$ are maintained in a vertical series by means of grooved wooden supports fixed to the sides of the said cells as shown in Figs. 4, and 5, the grooves being indicated at $x$. $x$. Both the sections $h$ and $i$ are filled at the commencement with a solution of sodium chloride which is caused to flow into them at the bottom through the pipes $l$ and $m$ respectively from the supply tanks. The solution will quickly circulate upward, (whereby the polarization will be reduced to a minimum) and will be decomposed by means of a current of electricity which is caused to pass through the same, whereby chlorine will be evolved in the anode section $h$ and caustic soda will be formed in the cathode section $i$.

The flow of the solution can be regulated and maintained in a known simple and automatic manner such, for example, as by placing the supply-tanks at a suitable elevation, and also by arranging the vessels so that the two solutions can flow through their respective sections in the entire series into delivery tanks, from whence the solutions are pumped by suitable pumps, back to the supply-tanks, the circulation being maintained until the solutions are sufficiently decomposed and the caustic soda solution is of the strength required for any particular purpose, the solution of sodium chloride being gradually changed to caustic soda. Each electrolytic vessel is sealed by a porcelain or other suitable cover $u$, and pipes $v$ are connected with the sections $h$, $h$ to conduct the chlorine gas away.

I will now describe my oblong form of vessel shown in Fig. 3. In this arrangement the electrolytic vessel is divided into a series of anode and cathode sections by the anodes and cathodes in the form of plates marked $d$ and $a$ respectively and extending, as also do the porous partitions $g$, across the vessel between the sides thereof. The porcelain troughs are maintained in a vertical series to form a diaphragm in the rectangular cells by means of two frames, say of ebonite or teak having grooves in the same, into which the ends of the troughs are securely cemented. The cathodes, which in this instance do not form the walls of the vessel, I have indicated as not being carbon covered. The pipes $l$ and $m$ are arranged so as to allow the solutions to flow through their respective chambers, chlorine and caustic soda being produced and collected in a similar manner to that described above.

The caustic soda solution produced by the method hereinbefore described contains a certain proportion of sodium chloride in solution, and for some purposes I find it advantageous to eliminate such sodium chloride. This I accomplish by transferring the caustic alkaline liquor from its tank to evaporating pans in which the liquor is concentrated until the sodium chloride is precipitated and the caustic soda alone remains in solution. If, however, the caustic soda is required in the solid form I continue the evaporation to a further stage until the residual liquor becomes so concentrated as to solidify on cooling and is then packed in the usual manner.

Having now particularly described and ascertained the nature of my said invention and in what manner the same is to be performed, I declare that what I claim is:—

1. In apparatus for the manufacture or production of chlorine or caustic soda by electrolysis, the combination in a cell, of a porous partition formed of a number of V-shaped troughs filled with asbestos fiber, or other suitable material, maintained in vertical series, substantially as hereinbefore described.

2. In apparatus for the manufacture of chlorine or caustic soda by electrolysis, the combination in rectangular cells, of porous diapragms formed of a series of V-shaped troughs filled with asbestos fiber, and maintained in vertical series, by suitable supporting frames.

3. The combination of the electrolytic vessel divided into a series of anode and cathode sections $d$, and $a$, made as described, insulating plate $f$, arranged in the bottom of the cell, a series of porous partitions formed of V-shaped troughs and asbestos fiber or suitable material between the anode and cathode sections, pipes $l$, and $m$, extending into the anode and cathode apartments respectively, and terminals $c$ and $e$, connected to the cathodes and anodes respectively, all substantially as set forth.

JAMES GREENWOOD.

Witnesses:
 G. F. REDFERN,
 JOHN E. BOUSFIELD,
*Of the firm of G. F. Redfern & Co., 4 South Street, Finsbury, London, Patent Agents.*